April 22, 1969        D. D. JAMES        3,439,798
MULTIPACK CARRIER
Filed Sept. 13, 1966
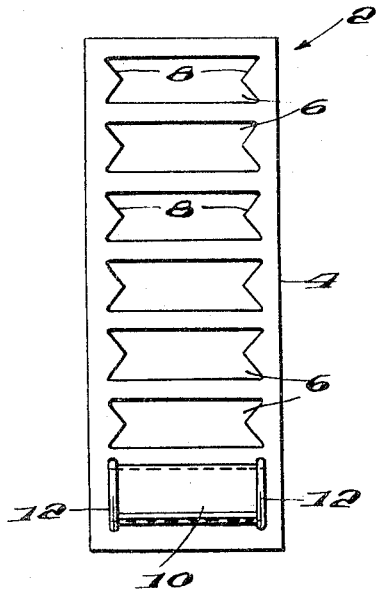
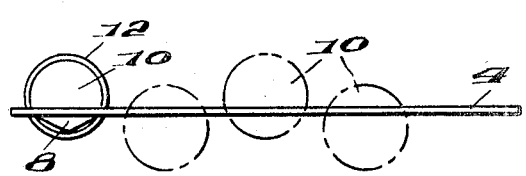
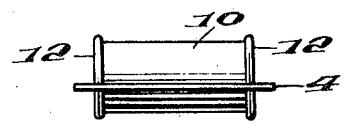
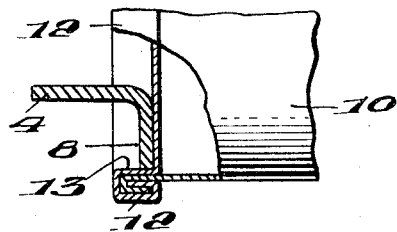
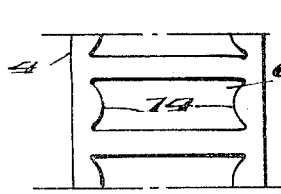
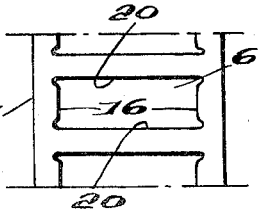
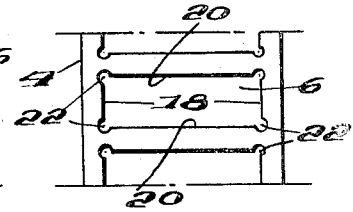
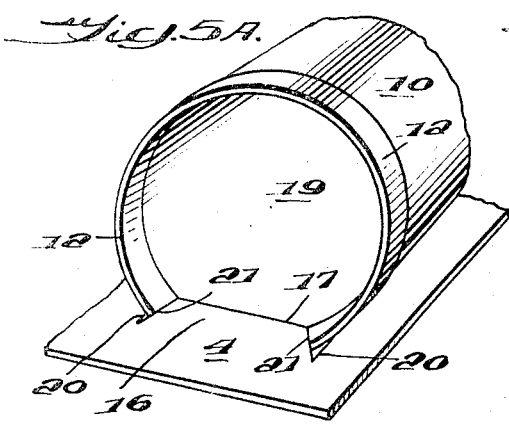
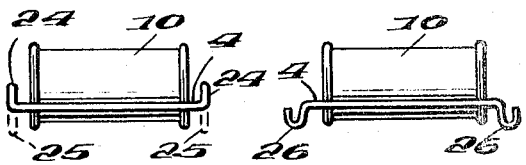

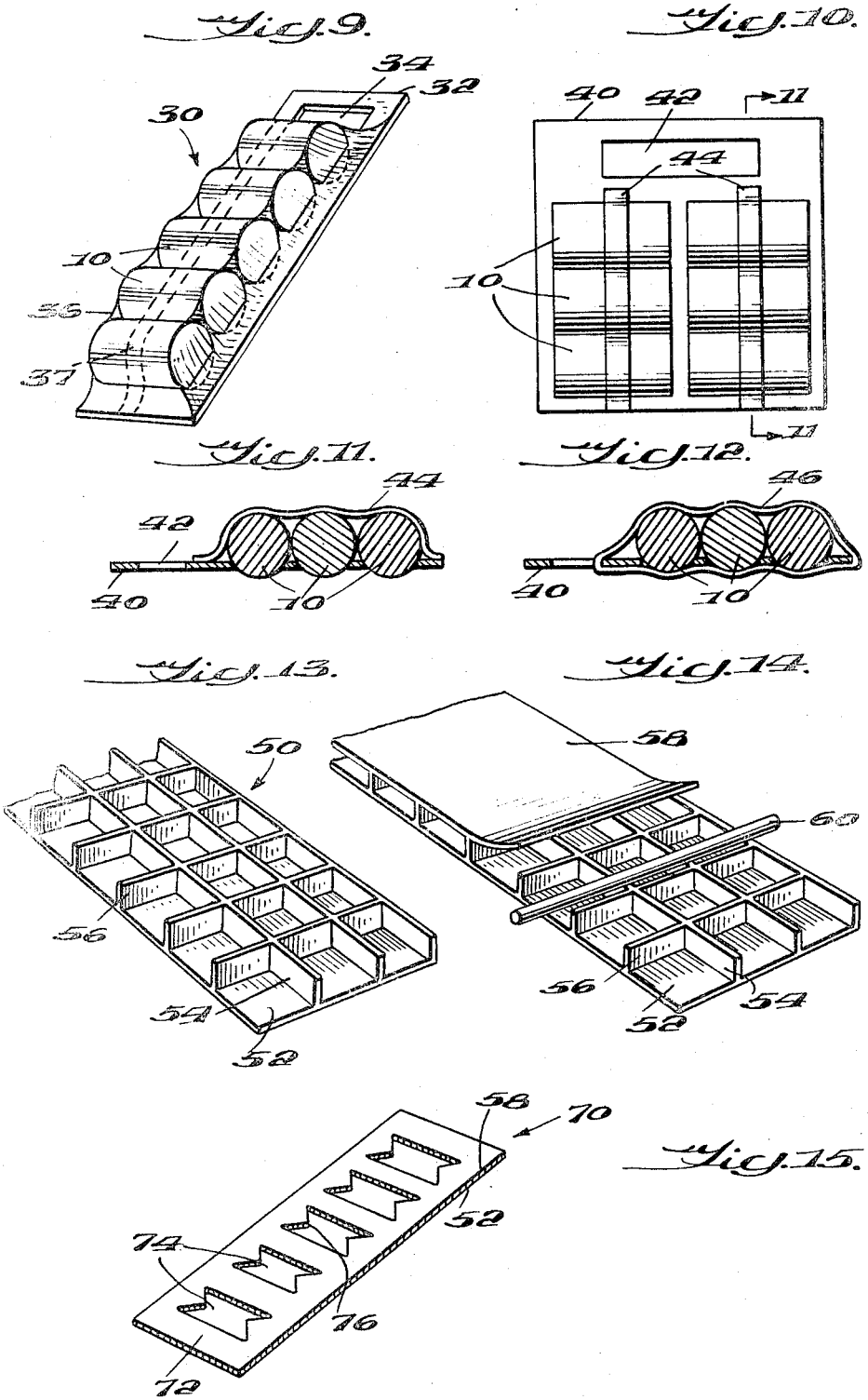

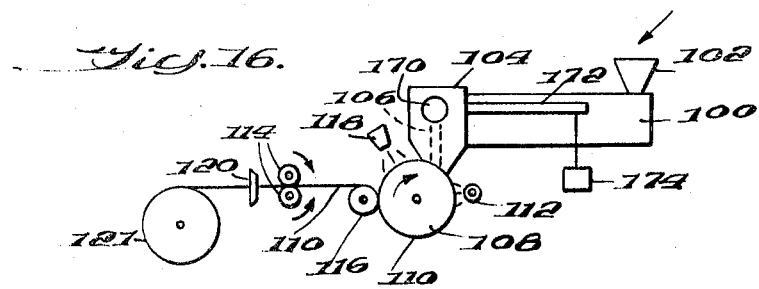
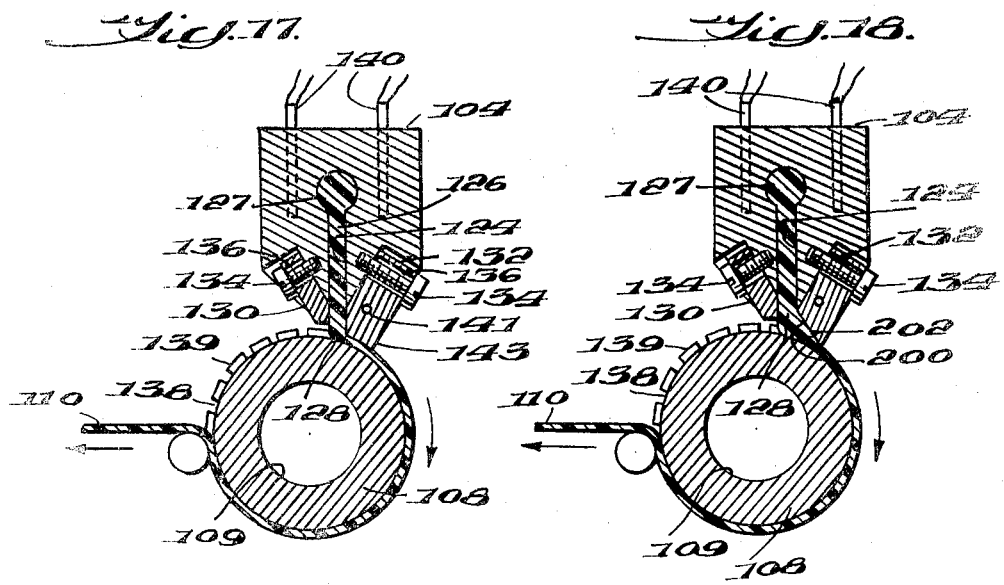
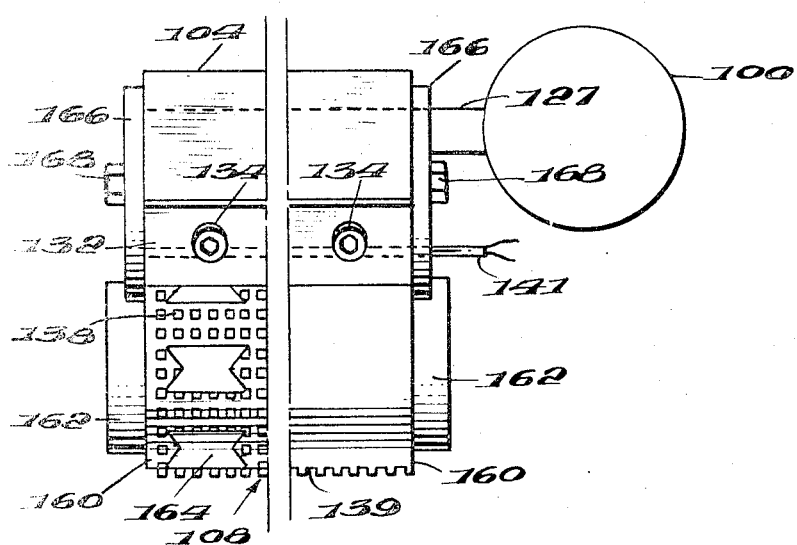

United States Patent Office 3,439,798
Patented Apr. 22, 1969

3,439,798
MULTIPACK CARRIER
David D. James, Wilmington, Del., assignor to E. I. du Pont de Nemours and Company, Wilmington, Del., a corporation of Delaware
Filed Sept. 13, 1966, Ser. No. 579,102
Int. Cl. B65d 85/62
U.S. Cl. 206—65                                    13 Claims

ABSTRACT OF THE DISCLOSURE

A carrier for a plurality of articles is made from a sheet of thermoplastic resin in the form of ribbed structure comprising film having a network of ribs integrally molded to each other and to the film, the ribbed structure having a bulk density of less than 30% the density of the resin, with the sheet having a plurality of apertures, at least one said aperture having tabs at a pair of opposite sides for cooperating with the remaining sides of said aperture for retaining an article therein.

---

This invention relates to packaging, and more particularly, to a carrier for multiple articles.

The carrier of the present invention comprises a sheet of material having a plurality of apertures therein with each of the apertures being for receiving an article, and with the sheet of material having tabs extending into the apertures for the purpose of retaining its respective article therein. In one embodiment of the invention the sheet of material is an elongated strip which can be cut to any length desired according to the number of articles to be carried thereby. In another embodiment, one of the apertures is left free of any article so as to provide a hand grip for the carrier. In still another embodiment of this invention, the sheet of material is made of thermoplastic resin formed into a special configuration which gives the carrier both strength and stiffness while requiring only a relatively small amount of the resin.

These and other embodiments of the present invention will be more fully discussed hereinafter with reference to the accompanying drawings in which:

FIG. 1 is a plan view of a carrier incorporating features of the present invention;

FIG. 2 is a side elevation of the carrier of FIG. 1;

FIG. 3 is an end elevation of the carrier of FIG. 1 and FIG. 3A is an enlarged, partly cut-away view of a portion of the view of FIG. 3;

FIGS. 4, 5, and 6 are each a partial plan view of a carrier of the present invention containing different embodiments of tabs; FIG. 5A is a partial perspective view of a can retained in an aperture of a carrier of this invention by tabs such as shown in FIG. 5;

FIGS. 7 and 8 are each an end elevation of a carrier of the present invention having different embodiments of longitudinal stiffeners;

FIG. 9 is a perspective view of a package incorporating a carrier of the present invention;

FIG. 10 is a plan view of another package incorporating the carrier of the present invention;

FIG. 11 is a section taken along line 11—11 of FIG. 10;

FIG. 12 shows a section similar to FIG. 11 but illustrating another embodiment of banding for use in the present invention;

FIG. 13 shows an enlarged perspective view of a ribbed structure from which carriers of the present invention can be made;

FIG. 14 shows another embodiment of ribbed structure and a method for manufacturing same;

FIG. 15 shows a carrier of the present invention which can be made from the ribbed structure of FIG. 14;

FIG. 16 shows in diagrammatic side elevation apparatus for making ribbed structure such as shown in FIG. 13;

FIG. 17 shows in cross section one embodiment of molding apparatus for use in the apparatus of FIG. 16;

FIG. 18 shows in cross section another embodiment of apparatus for use in the apparatus of FIG. 16; and FIG. 19 shows an embodiment for laterally confining molten thermoplastic resin and an embodiment of a roll pattern for making a continuous web of carrier sheet stock.

Referring now to the drawings, FIG. 1 shows a carrier 2 of a sheet 4 of material and having a greater length than width. Uniformly spaced along the length of the sheet 4 are a plurality of apertures 6 extending in a direction transverse to the length of the sheet to form a single row of apertures. Each of the apertures is provided with a pair of oppositely positioned tabs 8 formed integrally with the sheet 4 and being for the purpose gripping articles received in the aperture 6. The junction between the tabs 8 and the sides of the apertures is preferably rounded somewhat to avoid stress concentration. For illustrative purposes an article, e.g., a can 10 terminating in chimes 12 at its ends, is shown positioned in the lowermost aperture 6, which is visible in dashed lines only, in FIG. 1. The width of the aperture 6 is less than the width of the can 10, so that the can cannot pass through the aperture; therefore, as shown in FIG. 2, less than half of the can 10 extends through to the other side of the sheet 4. The can 10 is retained in the aperture 6 by cooperation between the tabs 8 at the end of the aperture and the sides of the aperture.

In one embodiment, the sides of the aperture prevent the can 10 from passing any further through the aperture, and the tab 8 of each end of each aperture abuts the inner side 13 of the chime of the can 10 as shown in FIG. 3A to prevent the can from falling out of the aperture. This locking action is obtained during the insertion of the can 10 into aperture 6, which causes the tab 8 to bend downwardly as shown in FIG. 3A and to spring inwardly when the chimes 12 of the can pass the extremities of the tabs 8. This insertion action can be repeated for each of the apertures 6 of the carrier 2 of FIG. 1 so that the carrier ultimately carries seven articles, such as the can 10 shown. The uppermost aperture 6 can be left free of an article in which case this aperture will serve to receive the fingers of a person to operate as a hand grip for the carrier. In such case the tabs 8 can be removed or omitted if desired.

FIGS. 4, 5, and 6 show different configurations of tabs which can be used in carriers of the present invention. In FIG. 4, the tabs 14 are arcuately shaped instead of being triangular as with the tabs 8 of FIG. 1. In FIG. 5, the tabs 16 are in the form of trapezoids. In FIG. 6, the tabs 18 have the same trapezoidal shape as the tabs 16 of FIG. 5; however, at the junction of the sides 20 of the aperture 6 and the tabs 18, are present circular cutouts 22 to accommodate the chimes of a can. Obviously, many other configurations of tabs are suitable for use in retaining articles in the apertures of carriers of this invention.

Instead of the locking action between the extremity of the tab 8, the sides of the aperture 6, and the inner side 13 of the chime as shown in FIG. 3A, the locking action, although less positively, can also be obtained with the tab lying substantially in the same plane as the sheet 4. This embodiment is shown in FIG. 5A wherein the extremity 17 of tab 16 is made to terminate at or short of the base 19 of can 10, and the converging sides 21 of the tab together with the sides 20 of the aperture grip the portions of the chime 12 passing therebetween. In this embodiment, the tabs 16 are bent upwardly and allowed to snap against the chimes of the can when inserted into the aperture 6 of the carrier.

Since the centers of gravity of the articles being carried do not coincide with the plane of the carrier, there is a tendency for the carrier to bow along its length (with the centers of gravity of the cans being on the outside of the bow) when the carrier is held so that its long dimension is vertical.

The amount of bowing depends on the length of the sheet 4, its inherent stiffness, the weight of the article being carried, and the relative mass of each article on each side of the sheet 4. The net amount of bowing can be practically eliminated by alternating the sides of the sheet 4 from which the articles are sequentially inserted to obtain the alternating position of articles, such as cans 10 shown in dashed lines in FIG. 2.

Another way to prevent bowing of the sheet 4 of the carrier is to build greater stiffness into the sheet 4, such as providing thickened edges (not shown) along the length of the sheet. Other embodiments for accomplishing this result are shown in FIGS. 7 and 8. In FIG. 7, flanges 24 are provided running the length of the sheet 4. Alternatively, the flanges can be made to face in the opposite direction as shown by dashed lines 25. In FIG. 8, the longitudinal edges of the sheet 4 terminate in U-shaped channels 26.

Carriers of the present invention can be combined after they are filled with articles, with overwraps of various types if desired. In FIG. 9, is shown a package 30 comprising a carrier 32, of much the same type as the carrier 2 of FIG. 1, except that it contains only 6 apertures, with the uppermost aperture 34 being left free of any article and tabs, to serve as a hand grip for the package 30. The articles contained by the package 30 are cans 10 (shown, for simplicity, without chimes), which are locked in place by tabs in the same way as described for FIGS. 1 to 3A. The sides of the cans, i.e. the chimes 12, are substantially in abutting relationship with one another; this prevents bowing of the carrier 32 in the direction towards the side on which the greater mass of the cans is present. An overwrap 36 is provided to tightly encompass an entire side of the carrier 32 and the cans 10 to prevent bowing of the carrier in the opposite direction, thereby presenting a tight package. The overwrap 36 in this case is a tightly fitting transparent thermoplastic film which is heat-sealed to the edges of the carrier 32, except for the upper side, which is heat-sealed to the carrier 32 immediately below the aperture 34. The overwrap 36 can also be a length of heat-shrinkable thermoplastic tubing which is first inserted over the carrier 32 and the cans 10 retained thereby and then shrunk-fit thereover. Alternatively, a banding or strip 37 (shown in dashed lines) can be used to provide the tight package in the same manner as overwrap 36. The strip 37 can be of heat shrinkable material or material which is otherwise suiable for tightly holding the cans in the carrier.

In FIG. 10, is shown an embodiment in which carrier 40 contains two rows of apertures (not shown) each of which accommodates a can 10 in the same manner as described with respect to FIG. 1 to 3. In this embodiment, a single aperture 42 is provided at the top of the carrier 40 to serve as a single hand grip for the entire carrier. Strips 44 extend across one side of the cans 10 and are secured at their ends to carrier 40, as shown in FIGS. 10 and 11. The strips 44 are of the same material as strip 37. In another embodiment, as shown in FIG. 12, strips 46 (only one shown) extend through the aperture 42 and encircle the cans 10 retained by the carrier 40. The strip 37 can also be utilized in the same way as strips 46.

From the embodiments shown in FIGS. 1, 9, and 10, it is apparent that the carriers of the present invention can take many different forms to accommodate many different numbers of articles. In the carriers of FIGS. 1 and 9, the carrier need only be lengthened or shortened to accommodate different numbers of articles. A particular advantage of the carriers of the present invention is their ability to carry an odd number of articles in a symmetrical configuration. Tight overwrapping or banding can be used to add to the holding action obtained by the tabs and sides of the carrier apertures, and in addition, to counteract any bowing of the carrier. As previously stated, bowing in one direction can be prevented by proper spacing of the articles being carried, i.e. by having them in side-to-side contact.

Carriers of the prevent invention can be made of any material desired, depending on the nature and number of the articles to be carried. Thus, the carriers can be made from paper-based packaging materials such as paperboard, boxboard, and fibreboard. Preferred materials of construction, however, are thermoplastic resins which can be formed into carriers with flexible tabs by such processes as injection molding or blanking from a solid sheet of thermoplastic resin. These resins resist the propagation of tears which is important for both the retaining and hand-gripping functions of the carrier. Preferably, the resin is in the form of a ribbed structure 50 (FIG. 13) comprising a network of ribs integrally molded to each other and at least one film integrally molded to one side of said network of ribs. This ribbed structure gives a high stiffness relative to the amount of resin present in the structure and still gives a high resistance to tearing. Tabs formed from the bent ribbed structure, while sufficiently flexible to permit bending without loss of strength, also have a high spring-back tendency which assures a firm grip on the ends of cans and the like positioned in the carrier apertures. Because of this high spring-back tendency, the tabs can be mechanically bent back, the can inserted into the carrier aperture, and then the tabs released against the can ends. The characteristics of high stiffness and springback make the ribbed structure ideally suited for the holding arrangement shown in FIG. 5A.

As shown in enlargement in FIG. 13, the ribbed structure 50 can consist of a continuous film 52 forming one surface of the structure and molded integrally therewith a network of ribs consisting of ribs 54 and 56 intersecting with one another to form a pattern of squares between the ribs. The intersections of the ribs 54 and 56 are also integrally molded.

Generally, the ribs are spaced as far apart as possible to obtain low bulk densities yet while having sufficient stiffness. Bulk densities for the network of ribs and for the ribbed structure can be less than 20% and 30%, respectively, and preferably less than 12% and 20%, respectively, of the density of the resin from which the structure is made. Representative dimensions for ribbed structures which can be made by the process to be described hereinafter, as follows, all dimensions being in inches:

| Width of ribs | Height of ribs | Spacing between ribs | Film thickness |
| --- | --- | --- | --- |
| 0.004 | 0.025 | 0.073 | 0.0017 |
| 0.005 | 0.038 | 0.107 | 0.0025 |
| 0.006 | 0.056 | 0.150 | 0.0035 |
| 0.007 | 0.072 | 0.170 | 0.0040 |

The ribbed structure of FIG. 13 can be laminated to webs of other materials to increase stiffness. For example, FIG. 14 shows the lamination of a film 58 of thermoplastic resin to the tops of the ribs 54 and 56 immediately after heat softening the film and the tops of the ribs, moving in the direction indicated, with a heat source such as burner 60. Such a laminate generally has a bulk density less than 35% of the resin(s) with which it is made. A different web of material, made of plastic, metal, cloth, wood or paper can be laminated to the ribs or the exterior of either film 52 or film 58 after application of a suitable adhesive, if necessary. Pressure can be applied after lamination to strengthen the bond between lamina, such as by passing the resultant laminate composed of ribbed structure and layer(s) of web material between the nip of a pair of rotating rolls spaced apart slightly less than the thickness of the laminate. In place of the burner 70, a freshly extruded film of thermoplastic resin can be lamiated to tops of ribs 54 and 56 by the application of pressure alone.

The ribs 54 and 56 of the ribbed structure are uniplanar and can be interconnected to form a network of many different patterns of polygonal shapes, such as rectangles, triangles, or hexagons, or of curvilinear shapes, such as circles, instead of the pattern of squares shown in FIG. 13.

In FIG. 15 is shown, in enlarged thickness, a carrier 70 made from a sheet 72 of a ribbed structure of FIG. 14, with the films 52 and 58 of the ribbed structure being indicated by number and with the ribs 54 and 56 being shown as short vertical lines extending from film 52 to film 58. The sheet 72 is provided with apertures 74 and flexible, integrally molded tabs 76 for retaining articles in the apertures.

The sheet 72 is formed from a continuous web of ribbed structure such as shown in FIG. 13 in which the apertures 74 are formed in the web as it is molded or in a subsequent operation. The second film 58 can be laminated to the tops of the ribs 54 and 56 at any point desired after the formation of the web and the apertures formed in this second film in a subsequent operation.

Apparatus for continuously molding ribbed structure such as of FIG. 13 is shown in FIG. 16. In this figure, an extruder 100 is equipped with a hopper 102 for receiving thermoplastic resin and melting it under pressure. A die 104 receives the pressurized molten resin through its rear (hidden) side from the extruder and passes the resin along a path 106 which terminates in an outlet in pressure-seal relation with a rotating patterned roll 108 and directs the resin substantially free of pressure drop and in the absence of air into the pattern of the roll. The roll 108 continuously moves the molten resin away from the outlet of path 106, thereby forming a continuous molded web 110 having a pattern which is complementary to that of the roll. The web 110 is chilled by a flume or water spray 112, and after sufficient contact with the roll 108 which is internally cooled, the cooled web is removed from the roll by take-off rolls 114 aided by a stripper roll 116 and, optionally, mold release agent applied by spray nozzles 118 to the surface of the roll prior to passage under die 104. Longitudinal dividing or trimming of web 110 is accomplished, if desired, by one or more blades 120 positioned between the take-off rolls 114 and reel 121.

To further describe the die 104 and patterned roll 108, which comprise the molding apparatus, FIG. 17 shows one embodiment in which die 104 contains a cavity 124 serving as path 106 (FIG. 16) and which is supplied with molten thermoplastic resin 126 through inlet pipe 127 by extruder 100 (FIG. 16). Cavity 124 terminates in a slot-shaped outlet 128 extending across the surface of roll 108. The rearward and forward edges of outlet 128 are defined by a die plate 130 and a doctor blade 132, each adjustably spaced from roll 108 and secured to die 104 by bolts 134 extending through slots 136. The pressure upon the molten resin 126 in the cavity forces the resin through outlet 128 and into the roll pattern represented by transverse grooves 138 (enlarged in spacing and width for clarity) and circumferential intersecting grooves 139. The cavity 124 and outlet 128 are substantially free of constriction so that the pressure on the resin at the surface of roll 108 is substantially the same as the pressure on the resin in cavity 124.

The grooves 138 and 139 mold one surface of the web 110. The opposite surface of the web is formed by doctor blade 132 which is adjustably spaced from roll 108 to give the web thickness desired. Die 104 is heated to a temperature above the resin melting temperature of the particular resin being used, by electrical heating elements 140 extending into corresponding wells in the die. The resin melting temperature is the minimum temperature at which a fresh sample of resin leaves a molten trail as it is moved slowly across a heated metal surface. This is also sometimes called the stick temperature.

Doctor blade 132 is heated by an electrical heating element 141 usually to a temperature which is equal to or greater than the temperature maintained by die 104. The outer face 143 of the doctor blade departs sharply from the path of web 110 so as to avoid sticking of the web to the hot doctor blade. Roll 108 is cooled to a temperature which is at least about 10° C. less than the melting temperature of the resin being molded, such as by passing a cooling medium through an interior passage 109.

In FIG. 18 essentially the same equipment arrangement as in FIG. 17 is used except that slot-shaped outlet 128 includes a wedge-shaped passage 200 extending in the direction of rotation of roll 108. The wedge-shape of the passage 200 is formed by doctor blade 132 having a slant surface 202 facing the roll 108. Movement of the surface of roll 108 past the opening 128 drags molten resin into the passage 200 wherein the flowing resin is forced into the pattern on roll 108. This drag flow pressure created in the passage 200 at the surface of the roll augments the pressure on the resin within cavity 124 of the die.

The molding apparatus of FIGS. 17 and 18 can be provided with water spray 112 and mold release spray nozzles 118 as shown in FIG. 16.

A pressure-seal relation between the outlet 128 for the molten thermoplastic resin and roll 108 is maintained so that the pressure on the resin in cavity 124 and the drag flow pressure, when the apparatus of FIG. 18 is employed, are available to force the resin into the pattern of roll 108 on a continuous and high speed of production basis. The pressure-seal-relation is obtained, in part, by adjusting the doctor blade 132 to constrict the flow space for the resin as it leaves outlet 128 and by having a sufficient rate of web formation for the viscosity of the particular resin being molded to prevent back flow under the die plate 130 which is generally spaced 2 to 10 mils from the surface of roll 108.

FIG. 19 shows, in indeterminate width, means for laterally confining the molten thermoplastic resin as it leaves opening 128 so as to complete the pressure-seal relation. In FIG. 19, the doctor blade 132 is shown in operative position and provided with heating element 141. The lateral surface of the roll 108 is provided with a pattern shown in enlargement and consisting of (a) transverse grooves 138 and circumferential grooves 139 (both enlarged for clarity), terminating at shoulders 160 formed between the surface of the roll and cylindrical ends 162 of reduced diameter extending from each end of the roll and (b) raised areas 164. The molten resin from cavity 124 is molded into a web which extends entirely across the roll pattern. Further sideways flow of the resin, however, is prevented by a pair of end plates 166 adjustable spaced from roll 108 by bolts 168 passing through slots (not shown) in the end plates and tightened into die 104. The end plates 166 each lie close to the shoulders 160 and have a lower arcuate surface lying close to the corresponding surface of cylindrical ends 162. This close spacing, on the order of several mils, permits a small amount of molten resin to enter the tortuous path around shoulders 160 before chilling of the resin occurs. This chilling prevents sideways leakage of additional resin and loss of molding pressure. A low friction pressure sealing system, without the need for metal-to-metal contact or necessity for further lubrication, is provided by this small amount of resin entering between end plates 166 and roll 108. The end plates 166 also form the lateral sides for cavity 124 and the die outlet 128 which is coextensive therewith.

Means can also be provided for changing the spacing between the die 104 and the roll 108 to compensate for pressure fluctuations caused by extruder 100 so as to maintain a constant force on the resin entering the roll pattern. Exemplary of such means is the pivotal mounting of die 104 about a stub shaft 170 which is on center with the feed line between extruder 100 and the die, and providing a lever arm 172 having the desired weight 174 suspended therefrom as shown in FIG. 16. Excessive molding pressure is relieved by the die 104 rotating away from roll 108. Upon return of the pressure to normal, weight 174 restores the die 104 to its former position to produce web of the desired thickness.

To fill rib patterns in the surface of the roll rotating at a given speed, not only must the pressure on the resin and its volume be sufficient, but the pressure must also be supplied for sufficient duration to cause the resin to flow into the pattern. To accomplish this, it is preferred, where possible depending on the pattern, to have the width of outlet 128 in the direction of rotation of roll 108 greater than at least one repeat unit in the pattern.

In operation, the roll 108 is rotated and molten thermoplastic resin is forced into the pattern of the roll. Molten resin which is contiguous with the surface of the roll and molten resin within the rib pattern is formed into a film by doctor blade 132. The resin is cooled and removed from the roll as a continuous, integrally molded patterned web, with the rib pattern being complementary to that of the pattern in the roll 108 and consisting of a plurality of longitudinally extending ribs corresponding to grooves 139 and transversely extending ribs corrseponding to grooves 138 and areas of thin film corresponding to raised areas 164. The thin film corresponding to raised areas 164 is subsequently removed such as by cutting to yield apertures 74 of the carrier sheet 72 (FIG. 15). A film such as film 58 of FIG. 14 can be laminated to the tops of the ribs and apertures 74 formed in it in the same or different cutting operation. Alternatively, the doctor blade 132 can be maintained in contact with the surface of raised areas 164, which are elevated above the adjacent areas by an amount equal to the thickness of film 52 whereby no film is formed over raised areas 164 and the resultant web will already have the apertures 74 formed therein. A still further alternative is to have the roll pattern and thus the web pattern consist entirely of a network of ribs and selectively cutting out portions thereof to form apertures 74. In any of these alternatives, the cut-out resin is recyclable to extruder 100. The web can be longitudinally trimmed to form a plurality of carrier sheets in a single web width and is transversely severed to define the length of the sheets as desired. The carrier sheet can be supplied to packers in the form of a reel of continuous strip, which is continuously fed into the packing line and transversely severed to the desired length in the line.

Details illustrating the manufacture of web such as web 110 are as follows: The patterned roll has a pattern in its surface consisting of grooves 0.010 in. wide x 0.050 in. deep running parallel to and perpendicular to the direction of rotation of the roll to form squares measuring about ⅛ in. on a side and areas measuring 2 in. x 3 in. in which no grooves are present and spaced ⅜ in. apart in all directions. The roll is maintained at a temperature of about 80° C. and is rotated at a surface speed of about 20 ft./min. Polyethylene is forced at 275° C. and at a pressure of about 250 p.s.i.g. into the pattern of the roll from a pivotally mounted die having its outlet 128 and doctor blade 132 maintained about 0.004 in. from the roll during operation by a weight acting through a 30 in. lever arm. No mold release agent is used. The resultant web consists of a continuous film measuring about 0.004 in. in thickness and having integrally molded ribs arranged in a square pattern ⅛ in. on a side, the ribs measuring 0.010 in. wide x 0.050 in. deep and areas of film without ribs and spaced from one another by ⅜ in.

A laminate is made from the web formed as just described by extruding a 0.004 in. polyethylene film from a film die at 275° C. onto a chill roll operating at 88° C. and forming a 0.056 in. nip with another roll and simultaneously passing the film and web, rib-side towards the film through the nip to thereby force the film against the ribs of the web to form a laminate containing a core of upstanding ribs. The areas of film without ribs and corresponding areas of the laminated film are simultaneously cut-out by rotating blades.

A ribbed structure is made in the same equipment but from 66 nylon instead of polyethylene, by operating the patterned roll at 150° C. and a molding temperature of 270° C. and pressure of 100 p.s.i.g.

The thermoplastic resins which are useful in making carriers of the present invention are any of which are extrudable into continuous solid shapes from a heated, molten condition and under relatively high pressures. Examples of suitable thermoplastic resins include polystyrene, high impact polystyrene, ABS resin, the saturated hydrocarbon polymers, such as polyethylene, linear or branched, propylene and copolymers thereof; ionomers such as described in Canadian Patents 674,595 and 713,631 both to R. W. Rees; copolymers of ethylene with an $\alpha,\beta$-unsaturated carboxylic acid such as described in British Patent 963,380 to Du Pont, and blends thereof with saturated hydrocarbon polymers and such blends containing co-crystallized oxide water activated crosslinking agents such as described in U.S. patent application Ser. No. 248,229, filed Dec. 31, 1962, by Halliwell et al.; halogenated or perhalogenated olefins, such as vinyl chloride polymer and melt fabricable tetrafluoroethylene polymers such as copolymers thereof with hexafluoropropylene, and chlorotrifluoroethylene polymer; polyvinyl acetate and copolymers thereof with saturated hydrocarbon polymers and optionally, the acid copolymers of British Patent 963,380 to Du Pont; polymers of $\alpha,\beta$-unsaturated carboxylic acid, such as polymethylmethacrylate; the polyamides such as polyhexamethylene adipamide (66 nylon), polyhexamethylene sebacamide (610 nylon), polycaprolactam (6 nylon), copolymers, ionomers, and/or saturated hydrocarbon polymers; polyoxymethylene polymer and copolymer; polycarbonate; polyethylene terephthalate.

The particular molding temperatures employed in making ribbed structures for use in carriers will depend upon such operating conditions as the speed of the patterned roll 108 and the intricacy of the pattern therein. Typical molding temperatures for some of the thermoplastic resins suitable for use in the present invention are as follows: linear polyethylene 200–250° C.; branched polyethylene 180–190° C.; polypropylene 200–250° C.; polystyrene 240–280° C.; polyvinyl chloride 150–170° C.; and 66 nylon 260–350° C. If it be desirable to have the tabs, such as tabs 8 of FIG. 1, slightly bent before insertion of the can into the carrier aperture, the tabs can be scored in the same manner as paper-based packaging materials, bent to the position desired, or bent without scoring and then heat set to remain in the bent position. Heat setting can also be applied to stabilize the flanges 24 (FIG. 7) or channels 26 (FIG. 8) after they are formed by bending. The heat setting temperature for stabilizing tabs of representative thermoplastic resins in their bent position are as follows: linear polyethylene 90° C.; polypropylene 100° C.; polystyrene 90° C.; polyvinyl chloride 95° C.; and 66 nylon 170° C.

The wedge-shaped passage 200 can be of any configuration which augments the molding pressure supplied by the extruder. Generally, the passage 200 will take the form of converging surfaces, with the roll pattern forming one of these surfaces. The pressures required on molten thermoplastic resin in cavity 124 can be less than the full extrusion pressure of the extruder, depending upon which resin is employed and upon operating conditions. The pressure in the cavity 124, however, is substantially the same as the pressure on the resin coming into contact with the pattern of the roll surface. When such pressure is insufficient, the drag flow arrangement of FIG. 18 can be used to increase the force present for continuously filling the pattern with molten resin.

As many apparently widely different embodiments of this invention may be made without departing from the spirit and scope thereof, it is to be understood that this invention is not limited to the specific embodiments thereof.

What is claimed is:

1. A carrier for a plurality of articles, comprising a sheet of material having a plurality of apertures each for receiving one of said articles lengthwise and each having flexible tab means for retaining the article lengthwise in its respective aperture, said sheet of material being of thermoplastic resin and comprising a ribbed structure of a network of intersecting ribs and a film along one surface of said network of ribs, said ribs being integrally molded to each other and to said film.

2. The carrier of claim 1 wherein said sheet is elongated in shape in one direction and said apertures extend in direction transverse to said one direction and are in a single row.

3. The carrier of claim 2 wherein at least one extra aperture is provided, in line with said row, as a hand grip for said carrier.

4. The carrier of claim 2 in combination with an overwrap for said articles carrier by said carrier to prevent bowing thereof.

5. The carrier of claim 2 wherein at least one channel is formed integrally with said sheet in the elongated direction thereof.

6. The carrier of claim 2 in combination with a tight banding for said articles carried by said carrier to prevent bowing thereof.

7. The carrier of claim 1 wherein another film is secured to the opposite surface of said network of ribs.

8. The carrier of claim 7 wherein said film is of thermoplastic resin.

9. The carrier of claim 1, wherein said tab means includes a pair of tabs positioned on opposite ends of their respective aperture for bearing against the ends of said article.

10. The carrier of claim 9 wherein said article is a can terminating in chimes at its ends and the width of said aperture is less than the width of said can, whereby said can may enter said aperture but not pass therethrough, with said tabs being for abutting the inner side of said chimes of said can after entry into said aperture to lock said can in place within said aperture.

11. The carrier of claim 1 wherein said article is a can terminating in chimes at its ends and the width of said aperture is less than the width of said can, whereby said can may enter said aperture but not pass therethrough, and said tab means includes a pair of tabs positioned on opposite ends of said aperture, with said tabs having converging sides and lying in substantially the same planes as said sheet of material for cooperating with the sides of said aperture for gripping the chimes of said can to retain it in said aperture.

12. The carrier of claim 1 wherein the bulk density of said ribbed structure is less than 30 per cent of the density of said thermoplastic resin.

13. The carrier of claim 1 wherein the spacing between said apertures is such that said articles received thereby are in side-to-side contact.

References Cited

UNITED STATES PATENTS

| | | | |
|---|---|---|---|
| 2,387,639 | 10/1945 | Bouchelle | 206—80 |
| 2,845,758 | 8/1958 | Lowthian | 206—79 X |
| 2,861,405 | 11/1958 | Hanford. | |
| 2,936,070 | 5/1960 | Poupitch | 206—65 |
| 3,141,913 | 7/1964 | Edwards. | |
| 3,143,266 | 8/1964 | Imatake | 206—65 X |
| 3,185,300 | 5/1965 | Potter | 206—80 |
| 3,200,944 | 8/1965 | Rapata | 206—65 |
| 3,224,576 | 12/1965 | Whiteford | 206—65 |
| 3,257,053 | 6/1966 | Mergi | 224—45 |

FOREIGN PATENTS 1,370,098   7/1964   France.

MARTHA L. RICE, *Primary Examiner.*

U.S. Cl. X.R.

224—45